United States Patent
Yotsuya et al.

[11] Patent Number: 5,914,833
[45] Date of Patent: *Jun. 22, 1999

[54] FLOATING TYPE HEAD SLIDER, FLOATING TYPE HEAD DEVICE, AND DISC DRIVE

[75] Inventors: Michio Yotsuya; Kazushige Kawazoe; Kanzo Okada, all of Miyagi, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/737,216

[22] PCT Filed: Mar. 7, 1996

[86] PCT No.: PCT/JP96/00563

§ 371 Date: Nov. 7, 1996

§ 102(e) Date: Nov. 7, 1996

[87] PCT Pub. No.: WO96/27876

PCT Pub. Date: Sep. 12, 1996

[30] Foreign Application Priority Data

Mar. 7, 1995 [JP] Japan ................................ 7-074447

[51] Int. Cl.$^6$ .............................. G11B 5/60; G11B 17/32
[52] U.S. Cl. ............................................................. 360/103
[58] Field of Search .................................... 360/102–103

[56] References Cited

U.S. PATENT DOCUMENTS

| | | | |
|---|---|---|---|
| 4,475,135 | 10/1984 | Warner et al. | 360/103 |
| 4,802,042 | 1/1989 | Strom | 360/103 |
| 5,097,370 | 3/1992 | Hsia | 360/103 |
| 5,343,343 | 8/1994 | Chapin | 360/103 |
| 5,396,386 | 3/1995 | Bolasna et al. | 360/103 |

FOREIGN PATENT DOCUMENTS

| | | |
|---|---|---|
| 58-64 670 | 4/1983 | Japan . |
| 2 244 420 | 9/1990 | Japan . |
| 3 125 378 | 5/1991 | Japan . |
| 5 198 116 | 8/1993 | Japan . |
| 6 333 354 | 12/1994 | Japan . |

*Primary Examiner*—John H. Wolff
*Attorney, Agent, or Firm*—Hill & Simpson

[57] ABSTRACT

A floating type head slider used in a disc drive using a disc-shaped recording medium, and adapted to float from the disc-shaped recording medium when the disc-shaped recording medium is rotationally operated. This head slider comprises an air lubricating surface formed on the surface opposite to the disc-shaped recording medium, a taper portion provided at the air inflow end side of the air lubricating surface, a recessed portion of a fixed depth adapted to produce negative pressure, the recessed portion being provided on the center line along the direction from the air inflow end side toward the air outflow end side of the air lubricating surface and being such that the air inflow end side is closed and the air outflow end side is opened, and a groove portion formed along the center line extending from the recessed portion toward the end portion of the air inflow end side of the air lubricating surface, and formed so as to have a width narrower than the recessed portion which divides the air lubricating surface and to have the same depth as that of the recessed portion.

This head slider is floated with a fixed floating quantity from the surface of the disc-shaped recording medium in a stable state by positive pressure produced between the air lubricating surface and the surface of the rotationally operated disc-shaped recording medium and negative pressure produced by the recessed portion.

19 Claims, 15 Drawing Sheets

FLOATING TYPE HEAD SLIDER, FLOATING TYPE HEAD DEVICE, AND DISC DRIVE

BACKGROUND OF THE INVENTION

This invention relates to a floating type head slider on which there is mounted a transducer such as a magnetic head, etc. for carrying out recording and/or reproduction of information signals with respect to a disc-shaped recording medium on which information signals are recorded, such as a magnetic disc or magneto-optical disc, etc., a floating type head device using such a head slider, and a disc drive using such a head device.

Hitherto, as the internal memory unit of an information processing device such as a computer, etc., or the external memory unit for a computer, disc drive mechanisms (hereinafter simply referred to as disc drive depending upon circumstances) using, as a recording medium, a hard disc which is the magnetic disc having rigidity, are used.

Such a disc drive comprises, as shown in FIG. 1, a magnetic disc 1 rotationally operated in the direction indicated by arrow $R_1$ in FIG. 1, at a constant angular velocity by the spindle motor, and a magnetic head unit 2 for scanning the signal area of the magnetic disc 1 extending over the inner and outer circumferences thereof. This magnetic head unit 2 is of a structure as shown in FIG. 2 in which a magnetic head 4 is integrally attached to a head slider 3 moving on the signal recording area of the magnetic disc 1. The magnetic head unit 2 is supported at the front end side of a rotational arm 5 rotationally operated in the direction indicated by arrow $X_1$ in FIG. 1, with the support shaft being as the center by the voice coil motor. Namely, the magnetic head unit 2 is adapted so that when the voice coil motor is driven so that the rotational arm 5 is rotationally operated, the unit 2 is caused to undergo movement operation in the direction indicated by arrow $X_1$ in FIG. 1 extending over inner and outer circumferences of the magnetic disc 1 rotationally operated, thus to carry out recording/reproduction of predetermined information signals with respect to recording tracks of the magnetic disc 1.

In this example, the head slider 3 is supported at the front end of the rotational arm 5 through a displaceable elastic (resilient) supporting member in the directions to come into contact with the surface of the magnetic disc 1 and to become away therefrom.

Meanwhile, the head slider 3 on which the magnetic head 4 is provided is adapted as shown in FIG. 2 so that a pair of side rails 6a, 6b forming air bearing are formed between the head slider 3 and the surface of the magnetic disc 1 on the both sides of the lower surface side opposite to the magnetic disc 1 to allow the portion between these side rails 6a, 6b to be a recessed portion 7. These side rails 6a, 6b are formed in a manner substantially in parallel to the tangential direction of recording tracks formed on the magnetic disc 1 when the magnetic head unit 2 is opposed to the magnetic disc 1. At the air inflow end side opposite to the rotational direction of the magnetic disc 1 of the side rails 6a, 6b, taper portions 8a, 8b are formed.

In this example, the magnetic head 4 is provided at the end portion of the air outflow side opposite to the air inflow side of the head slider 3.

The head slider 3 formed in a manner as described above is adapted when it is caused to be close to the surface of the magnetic disc 1 rotationally operated as shown in FIG. 1, it is caused to undergo floating force produced by air flow flowing into the portion between the side rails 6a, 6b and the surface of the magnetic disc 1 in accordance with rotation of the magnetic disc 1 so that it is floated from the surface of the magnetic disc 1. When the head slider 3 is floated from (i.e., above) the surface of the magnetic disc 1, the magnetic head 4 attached on the head slider 3 is also floated from the surface of the magnetic disc 1 as shown in FIG. 3, and is moved on the magnetic disc 1 in the state where a floating quantity d of a very small spacing (distance) is maintained between the magnetic head 4 and the surface of the magnetic disc 1. As stated above, as the result of the fact that the head slider 3 and the magnetic head 4 are moved on the magnetic disc 1 in a state floated from the surface of the magnetic disc 1, abrasion and/or damage of the magnetic disc 1 and the magnetic head 4 can be prevented.

In this example, the floating quantity from the magnetic disc 1 of the magnetic head 4 of the disc drive using the floating type head is approximately 0.1 $\mu$m.

When the head slider 3 of the floating type constructed in this way is used, even in the case where uneven portions exist to some degree on the surface of the magnetic disc 1, differences between these uneven portions is absorbed, thus permitting floating quantity d from the magnetic disc 1 of the head slider 3 and the magnetic head 4 to be substantially constant.

However, in the above-described head slider 3 of the floating type, in the case where any impact is applied to the magnetic disc 1, or in such cases that uneven portion or undulated portion of the surface of the magnetic disc 1 is great, there is the possibility that floating quantity d from the surface of the magnetic disc 1 may vary to much degree.

Moreover, in the case where the magnetic disc 1 is rotated with the angular velocity being constant, linear velocity would be varied at the inner and outer circumferences. Namely, the linear velocity of the magnetic disc 1 gradually becomes higher according as the movement position shifts from the inner circumferential side toward the outer circumferential side. For this reason, the floating quantity d from the magnetic disc 1 of the head slider 3 at the outer circumferential side and that at the inner circumferential side of the magnetic disc 1 would differ to much degree. Namely, the floating quantity d from the magnetic disc 1 of the head slider 3 varies in dependency upon the linear velocity. As a result, fluctuation (change) of the floating quantity corresponding to the linear velocity takes place.

On the contrary, when the rotational arm 5 is rotated in the direction indicated by the arrow $X_1$ in FIG. 4 on the surface of the magnetic disc 1, with a support shaft 8 being at the center, the head slider 3 attached to the front end of the rotational arm 5 is moved so as to trace a circular arc-shaped locus without experiencing linear movement in the radial direction of the magnetic disc 1. For this reason, as shown in FIG. 5, the center line $P_1$ of the head slider 3 is shifted from the tangential direction $S_1$ of the recording track $T_1$ of the magnetic disc 1, so skew angle θs would take place. This skew angle θs changes depending upon the position from the center of the magnetic disc 1. Namely, when the skew angle θs becomes large, efficiency of change with respect to the floating force of the dynamic pressure between the surface of the magnetic disc 1 and the head slider 3 is lowered. As a result, the floating quantity d becomes small.

From facts as described above, the floating quantity of the head slider 3 which becomes large at the outer circumferential side of the magnetic disc 1 where the linear velocity becomes large would be lowered as the result of the fact that the skew angle θs becomes large resulting from the fact that the head slider 3 is moved toward the outer circumferential side of the magnetic disc 1. In this case, fluctuation (change) of the floating quantity d of the head slider 3 based on change of linear velocity at inner and outer circumferences of the magnetic disc 1 becomes change following change of the linear velocity. However, fluctuation (change) of the floating quantity d by change of the skew angle θs becomes the secondary non-linear fluctuation in which it becomes large at the inner and outer circumferences of the magnetic disc 1 and becomes small at the central portion in the radial direction of the magnetic disc 1. Accordingly, as long as the head slider 3 constituted as shown in FIG. 2 is employed, it would become difficult to take balance between the linear velocity and the skew angle θs extending over the entire range in the radial direction of the magnetic disc 1.

For this reason, by the interaction between fluctuation (change) of the floating quantity d of the header slider 3 based on change in the linear velocity extending over the inner and outer circumferences of the magnetic disc 1 rotating at a constant angular velocity and fluctuation (change) of the floating quantity based on change of skew angle θs by movement of the head slider 3, the spacing (distance) between the magnetic head 4 and the magnetic disc 1 would be unable to be maintained constant. As a result, it becomes impossible to precisely control intensity of the magnetic field applied from the magnetic head 4 to the magnetic disc 1, giving rise to deterioration of the recording/reproduction characteristic of information signals. Thus, there is the possibility that precise recording and/or reproduction of information signals may be unable to be carried out.

As the floating type head slider of this kind, there is a head slider described in the Japanese Patent Publication No. 56635/1988, incorporated herein by reference.

SUMMARY OF THE INVENTION

With the above in view, an object of this invention is to provide a floating type head slider adapted for suppressing fluctuation (change) of the floating quantity with respect to the disc-shaped recording medium resulting from change in the velocity of the rotationally operated disc-shaped recording medium and/or change of movement position extending over the inner and outer circumferences with respect to the disc-shaped recording medium so that constant floating quantity can be guaranteed, and a floating type head device using such a head slider.

Another object of this invention is to provide a floating type head device which can carry out recording and/or reproduction of information signals with satisfactory recording and/or reproduction characteristic, and a disc drive using such a head device.

A floating type head slider according to this invention proposed in order to attain objects as described above comprises an air lubricating surface formed on the surface opposite to a disc-shaped recording medium, a taper portion provided at the side of an air inflow end of the air lubricating surface, a recessed portion of a fixed depth adapted to produce negative pressure, the recessed portion being provided on the center line along a direction from the air inflow end side toward the side of an air outflow end of the air lubricating surface and being such that the air inflow end side is closed and the air outflow end side is opened, and a groove portion formed along the center line extending from the recessed portion toward the end side of the air inflow end side of the air lubricating surface, and formed so as to have a width narrower than that of the recessed portion which divides the air lubricating surface and to have the same depth as that of the recessed portion.

The head slider constructed as just described above is floated with a constant floating quantity from the surface of the disc-shaped recording medium in a stable state by positive pressure between the air lubricating surface and the surface of the rotationally operated disc-shaped recording medium and negative pressure produced by the recessed portion. In the case where relative movement velocity between the head slider and the disc-shaped recording medium to which the head slider is opposed changes, positive pressure and negative pressure fluctuate (change) in the same direction. Accordingly, fluctuation (change) of the positive pressure is canceled by fluctuation (change) of the negative pressure. Thus, the fluctuation of the floating quantity from the surface of the disc-shaped recording medium of the head slider is reduced.

Moreover, a magnetic head is attached on the head slider formed as described above to constitute a floating type head device.

In this case, the magnetic head is attached to the end surface of the air outflow end side of the head slider.

Further, the floating type head device in which the magnetic head is attached on the head slider is used in the disc drive. In this instance, the magnetic head is attached at the position of the end surface side of the air outflow end side of the head slider, and at the position biased to the outer circumferential side of the disc-shaped recording medium. As the result of the fact that the magnetic head is attached at such a position, the disc-shaped recording medium can be scanned up to the outer circumferential side thereof by such magnetic head. Thus, improvement in the recording density of the disc-shaped recording medium can be made.

Still further objects of this invention and advantages obtained by this invention will more become clear from the explanation of the embodiments which will be given below with reference to the attached drawings.

These and other features of the invention are discussed in greater detail below in the following detailed description of the presently preferred embodiments with reference to the accompanying drawings.

DETAILED DESCRIPTION OF THE PRESENTLY PREFERRED EMBODIMENT

More practical embodiments of this invention will now be described with reference to the attached drawings.

Figure 1:
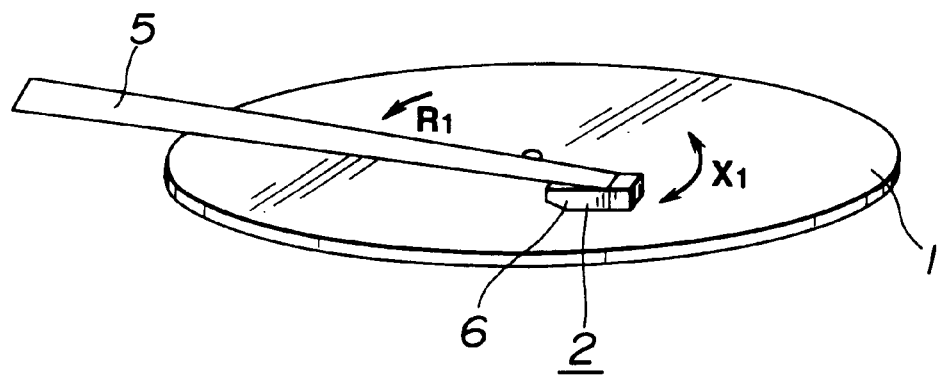
FIG. 1 is a perspective view showing the relationship between magnetic disc and rotational arm which supports head slider in a disc drive.
Figure 2:
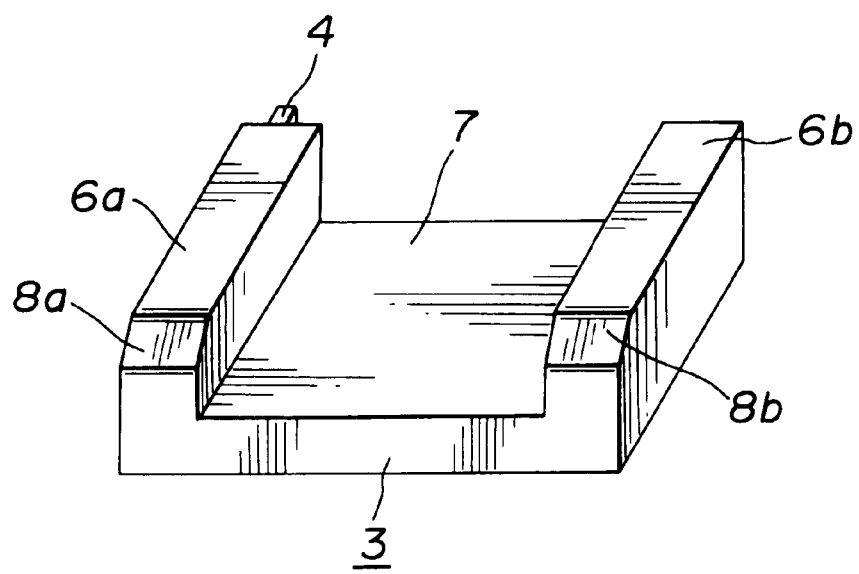
FIG. 2 is a perspective view showing a conventional floating type head slider.
Figure 3:
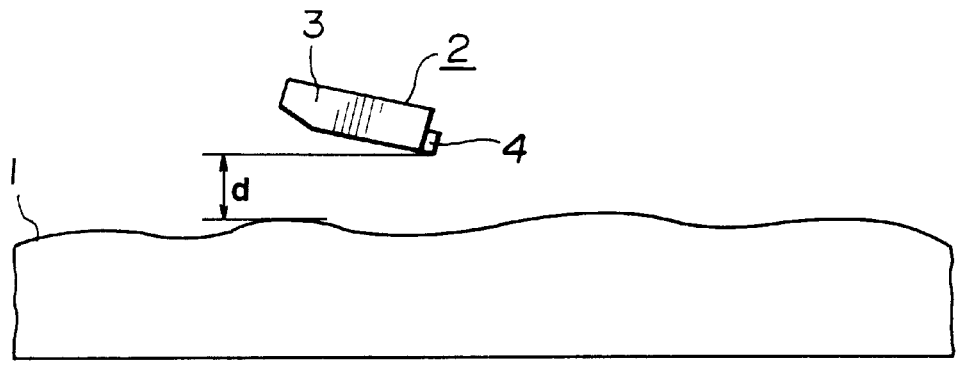
FIG. 3 is a side view showing the floating state from the surface of magnetic disc of the floating type head slider.
Figure 4:
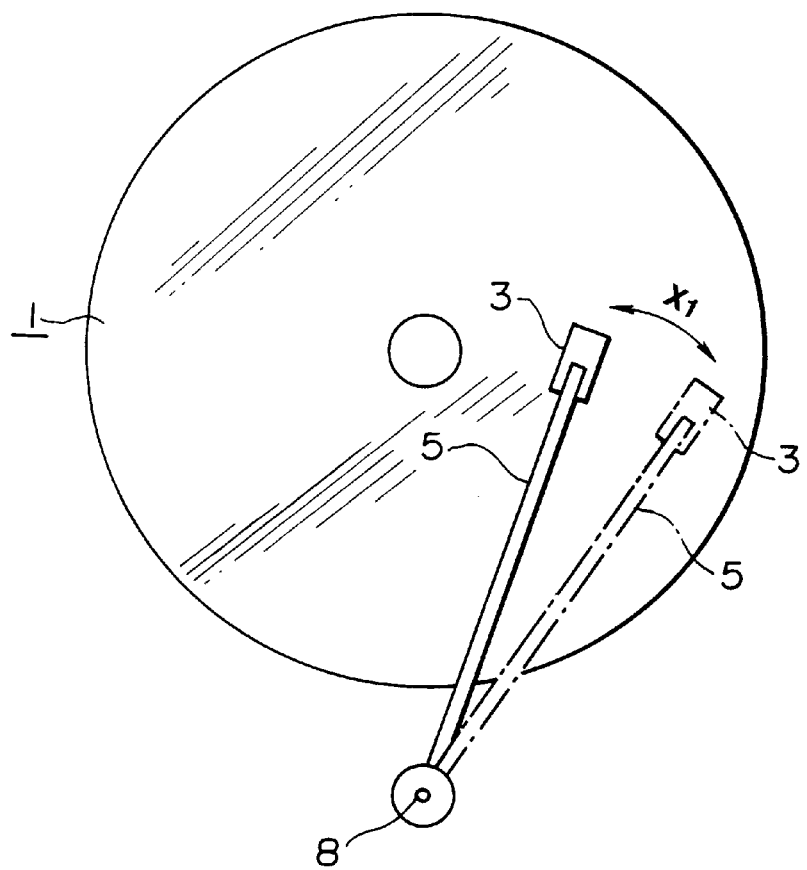
FIG. 4 is a plan view showing the state where rotational arm which supports the head slider is rotated to scan the signal recording area of the magnetic disc.
Figure 5:
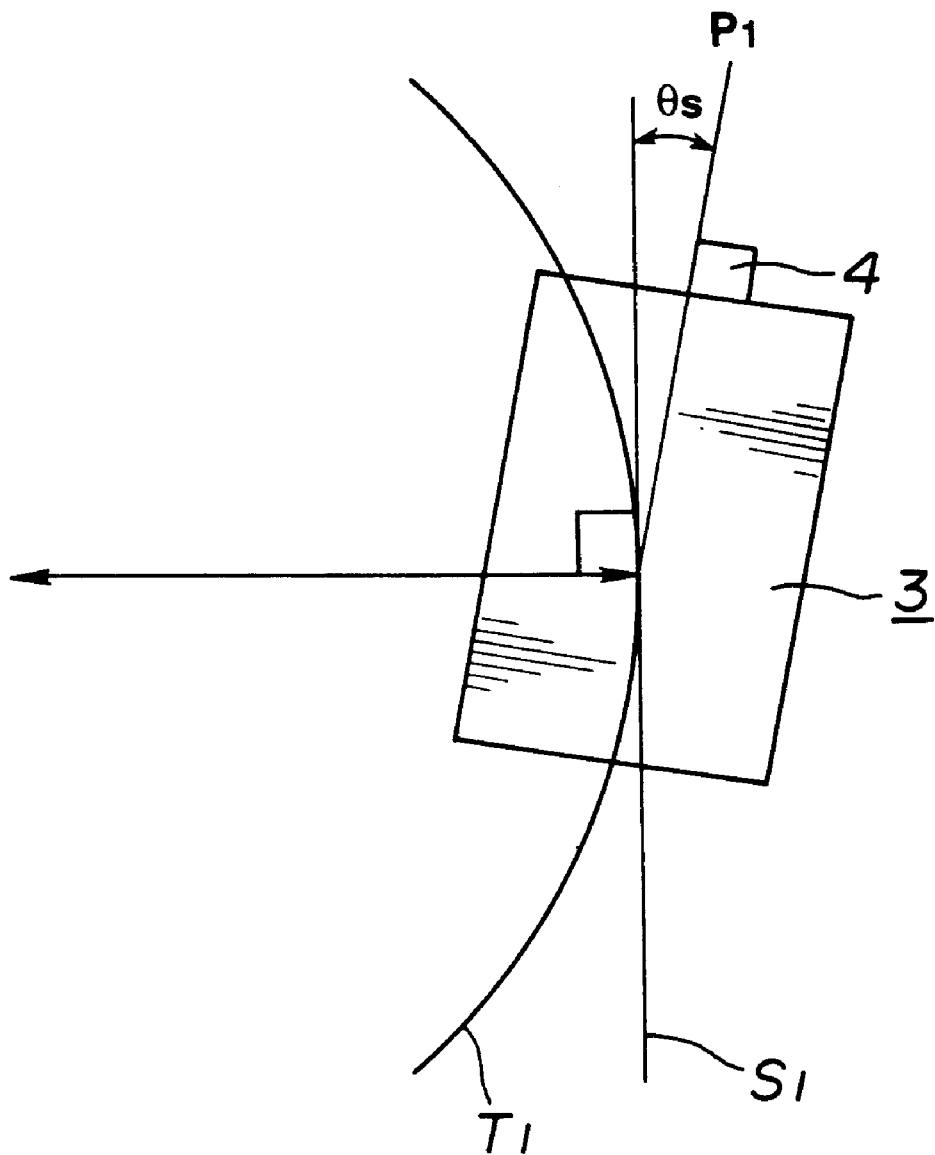
FIG. 5 is a plan view showing skew angle of the head slider when the signal recording area of the magnetic disc is scanned.
Figure 6:
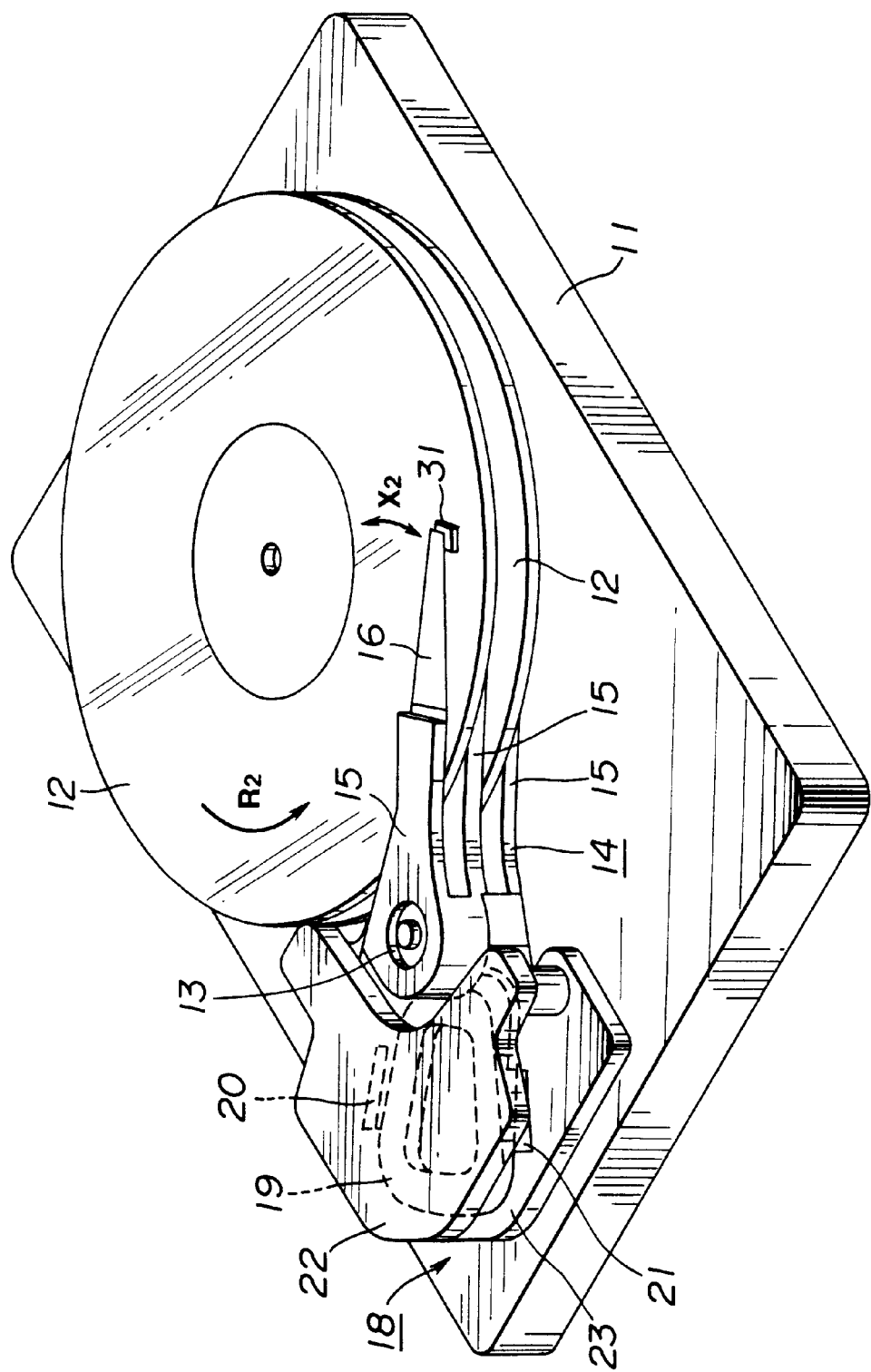
FIG. 6 is a perspective view showing a disc drive in which a floating type head slider according to this invention is used.

Initially, a disc drive (mechanism) in which a floating type head slider according to this invention is used will be described. This disc drive is directed to a disc drive in which hard disc which is magnetic disc having rigidity is used as a recording medium, and includes a supporting base (substrate) 11 formed by using metallic plate such as aluminum alloy, etc. as shown in FIG. 6, wherein magnetic discs 12 which are plural hard discs rotationally operated by a spindle motor (not shown) are disposed on the supporting base 11. The plural magnetic discs 12 are attached in a stacked manner in the state coaxial with the spindle shaft of the spindle motor, and are rotationally operated in the direction indicated by arrow $R_2$ in FIG. 6 at constant angular velocity in one body with the spindle shaft. Moreover, signal recording layers are provided on the both surfaces of the magnetic discs 12 used in this embodiment.

Further, a rotational arm 14 having a bottom end portion pivotally supported by a support shaft 13 vertically provided on the supporting base 11 and rotationally operated with the support shaft 13 being as center is disposed on the supporting base 11. This rotational arm 14 includes plural arm portions 15 extended toward the surfaces of the respective magnetic discs 12, wherein leaf springs 16 elastically (resiliently) displaceable in the direction to come into contact with the surfaces of the magnetic discs 12 and to become away therefrom are connected to the front end sides of the respective arm portions 15, and floating type head sliders 31, to which magnetic heads are respectively attached as described below, are attached to the front end sides of these leaf springs 16. The respective head sliders 31 are attached to the front end sides of the leaf springs 16 in a manner opposite to the surfaces of the respective magnetic discs 12.

Moreover, a voice coil 19 constituting a voice coil motor 18 is attached to the base end side of the rotational arm 14. Further, a pair of magnets 20, 21 constituting the voice coil motor 18 along with the voice coil 19 are disposed in a manner opposite to the voice coil 19. These magnets 20, 21 are disposed in such a manner that they are put between a pair of yokes 22, 23 disposed on the supporting base 11. In this example, when a drive current is delivered to the voice coil 19, the rotational arm 14 is rotationally operated in directions extending over the inner and outer circumferences of the magnetic disc 12 in the direction indicated by the arrow $X_2$ in FIG. 6 with the support shaft 13 being as the center.

The floating type head slider according to this invention attached to the front end side of the leaf spring 16 connected to the front end side of each arm portion 15 of the rotational arm 14, and caused to be opposite to the surface of each magnetic disc 12 will now be described in more practical sense.

Figure 7:
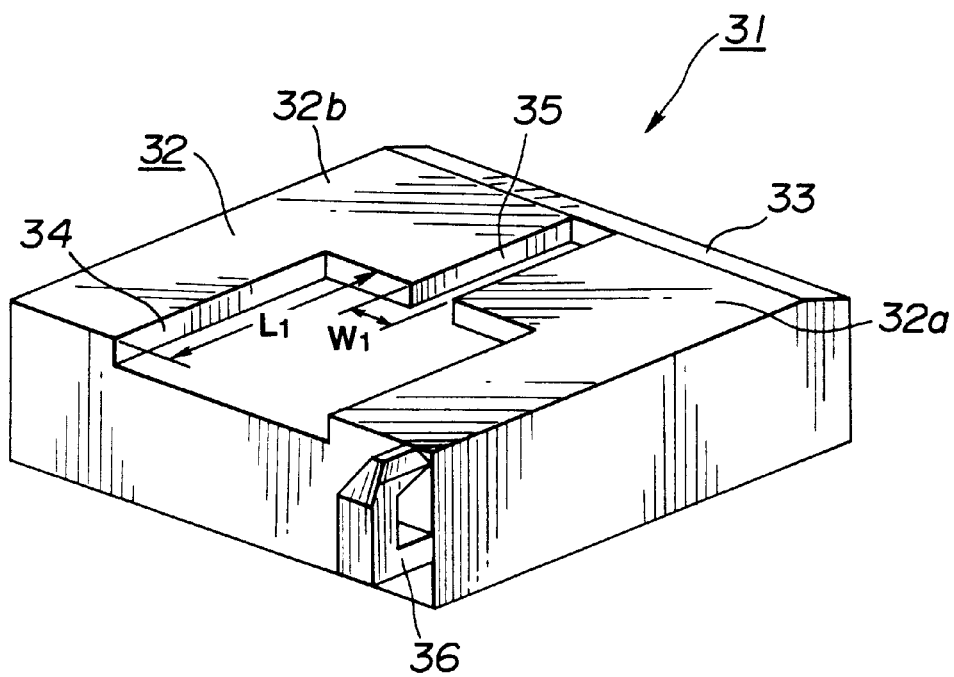
FIG. 7 is a perspective view showing the bottom surface side of the floating type head slider according to this invention.
Figure 8:
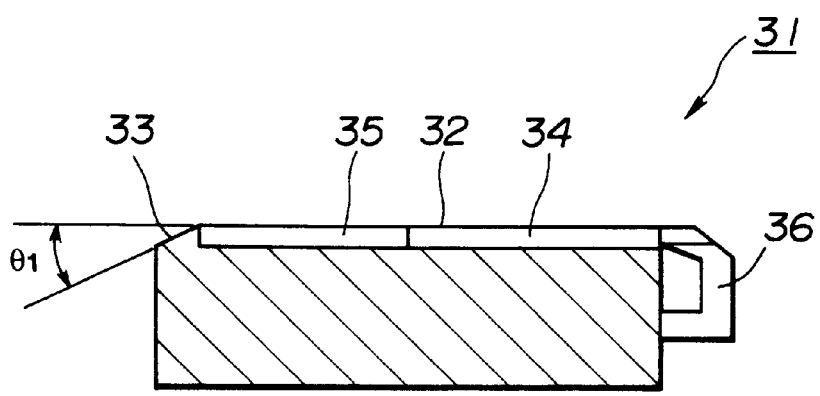
FIG. 8 is a longitudinal cross sectional view of the head slider.

The floating type head slider 31 according to this invention is formed as a flat parallelepiped as a whole as shown in FIG. 7. At the lower surface side opposite to the surface where the signal recording area is formed of the magnetic disc 12 when the head slider 31 is attached to the rotational arm 14, an air lubricating surface 32 formed as a flat surface is provided. This air lubricating surface 32 constitutes air bearing which is air flow along with the surface of the rotating magnetic disc 12. Moreover, at the lower surface side of the head slider 31, a taper portion 33 is formed at the corner portion positioned at the air inflow end side opposite to the rotational direction of the magnetic disc 12 when the head slider 31 is attached to the rotational arm 14. This taper portion 33 serves to allow air to smoothly flow into the portion between the air lubricating surface 32 the surface of the magnetic disc 12 when the magnetic disc 12 starts rotation. The taper portion 33 is formed so as to have inclination angle $\theta_1$ of about 0.85 degrees with respect to the air lubricating surface 32 as shown in FIG. 8.

Moreover, at the lower surface side where the air lubricating surface 32 is formed of the head slider 31, a recessed portion 34 is provided in such a manner to cut the flat air lubricating surface 32. This recessed portion 34 is formed as a rectangle (parallelepiped) extending to the portion in the vicinity of the central portion of the head slider 31 from the air outflow end side of the opposite side opposite to the air inflow end where the taper portion 33 is formed in the state positioned at the central portion in the width direction of the head slider 31. The recessed portion 34 is formed so as to have fixed depth of about 4 μm by the processing method such as etching processing, etc.

Further, there is formed a groove portion 35 having a width narrower than that of the recessed portion 34 extending from the end edge positioned at the air inflow end side of the internal side of the recessed portion 34 toward the position where the taper portion 33 is formed of the air inflow end side in the state positioned at the central portion in the width direction of the head slider 31. This groove portion 35 is formed so as to have the same depth as that of the recessed portion 34, and is formed by the etching processing, etc. along with the recessed portion 34.

Here, since the recessed portion 34 is formed extending from the air outflow end side toward the portion in the vicinity of the central portion of the head slider 31, it is formed in the state where the air outflow end side is opened and the air inflow end side is closed as shown in FIG. 7. Moreover, the groove portion 35 is also formed in the state where the air outflow end side is opened and the air inflow side is closed by the taper portion 33 as shown in FIGS. 7 and 8.

Further, since the recessed portion 34 and the groove portion 35 are formed extending from the air outflow end side toward the air inflow end side in the state positioned at the central portion in the width direction of the head slider 31, the air lubricating surface 32 is divided into two areas in left and right directions so that one side is caused to serve as a first rail portion 32a and the other side is caused to serve as a second rail portion 32b.

A magnetic head 36 is attached to the end surface of the air outflow end side of the head slider 31 to constitute a magnetic head device. This magnetic head 36 is attached at the position biased to one side surface side where the first rail portion 32a is formed as shown in FIG. 7. Namely, the magnetic head 36 is attached so that when the head slider 31 is attached to the rotational arm 14 of the disc drive, the magnetic head 36 is positioned at the outer circumferential side of the magnetic disc 12. By attaching the magnetic head 36 so that it is positioned at the outer circumferential side of the magnetic disc 12, it is possible to move the magnetic head 36 toward the outer circumferential side of the magnetic disc 12 without projecting the head slider 31 toward the outer circumferential side of the magnetic disc 12. Accordingly, large capacity of information signals of the magnetic disc 12 can be realized while realizing miniaturization of the disc drive.

The head slider 31 formed as described above is attached to the rotational arm 14 of the disc drive as previously described. When the magnetic disc 12 starts rotation in the state where the head slider 31 is disposed in a manner to be in contact with the surface of the magnetic disc 12 or to become close thereto, air flows into the portion between the air lubricating surface 32 of the head slider 31 and the surface of the magnetic disc 12 from the air inflow end side. As a result, positive pressure which is air pressure greater than atmospheric pressure is produced between the air lubricating surface 32 and the surface of the magnetic disc 12.

Moreover, at the portion of the recessed portion 34 formed so as to cut a portion of the air lubricating surface 32, negative pressure which is pressure smaller than pressure between the air lubricating surface 32 and the surface of the magnetic disc 12 is produced. Namely, since the recessed portion 34 is formed so as take a shape such that the air inflow end side is closed and the air outflow end side is opened, the inside of the recessed portion 34 is placed in negative pressure state by air flow which flows into the narrow space between the air lubricating surface 32 and the surface of the magnetic disc 12.

Thus, the head slider 31 is caused to undergo floating force by difference between positive pressure produced between the air lubricating surface 32 and the surface of the magnetic disc 12 and negative pressure produced between the recessed portion 34 and the surface of the magnetic disc 12 so that it is floated from the surface of the magnetic disc 12. At this time, the magnetic head 36 attached to the air outflow end side of the head slider 31 is also floated from the surface of the magnetic disc 12. In this case, the head slider 31 and the magnetic head 36 scan the surface of the magnetic disc 12 extending over the inner and outer circumferences in the state where they are spaced by a fixed distance from the surface of the magnetic disc 12 while being rotationally operated by the voice coil motor 18. Since the head slider 31 and the magnetic head 36 are caused to undergo movement operation while maintaining a fixed spacing without being in contact with the surface of the rotationally operated magnetic disc 12 as stated above, it becomes possible to prevent abrasion or damage of the magnetic disc 12 which may take place in the case where the head slider 31 and the magnetic head 36 come into contact with the surface of the magnetic disc 12.

Meanwhile, in the head slider 31 shown in FIGS. 7 and 8, since the recessed portion 34 is formed extending from the air inflow end side toward substantially the central portion of the head slider 31, the area extending from substantially the central portion of the head slider 31 to the air outflow end side is caused to serve as the air lubricating surface 32 extending over the entire width of the head slider 31. Since the air lubricating surface 32 having large area is formed at the air outflow end side as stated above, floating force produced by air flow which flows into the portion between the air lubricating surface 32 and the surface of the magnetic disc 12 can be made large. Namely, since the opposite area between the air lubricating surface 32 and the surface of the magnetic disc 12 can be made large, positive pressure produced between the air lubricating surface 32 and the surface of the magnetic disc 12 can be made large. Accordingly, even in the case where the relative movement velocity between the magnetic disc 12 and the head slider 31 is low, relatively large positive pressure can be obtained. Moreover, even if negative pressure takes place in the recessed portion 34, since large positive pressure is produced. large floating force can be obtained. Thus, it is possible to securely float the head slider 31 and the magnetic head 36 from the surface of the magnetic disc 12.

Moreover, in the case where the position of the head slider 31 is moved in the radial direction of the magnetic disc 12 rotationally operated at constant angular velocity, so the linear velocity of the magnetic disc 12 with respect to the head slider 32 changes, positive pressure produced between the air lubricating surface 32 and the surface of the magnetic disc 12 and negative pressure produced at the portion of the recessed portion 34 vary in correspondence with change of the linear velocity. The positive pressure and the negative pressure at this time both change in the same direction. Namely, when the head slider 31 is moved toward the inner circumferential side of the magnetic disc 12 where the linear velocity is low, positive pressure is lowered. At this time, the negative pressure changes so that it becomes low in correspondence with change of the positive pressure. On the other hand, when the head slider 31 is moved toward the outer circumferential side of the magnetic disc 12 where the linear velocity is high, positive pressure becomes high. At this time, negative pressure also becomes high in correspondence with change of the positive pressure. Accordingly, the head slider 31 and the magnetic head 36 are adapted so that even in the case where the head slider 31 is moved to any position extending over the inner and outer circumferences of the magnetic disc 12 rotating at constant angular velocity, fluctuation (change) of the floating quantity from the surface of the magnetic disc 12 is suppressed. Thus, even in the case where the head slider 31 is moved to any position of the inner and outer circumferences of the magnetic disc 12, substantially constant floating quantity is maintained.

Figure 9:
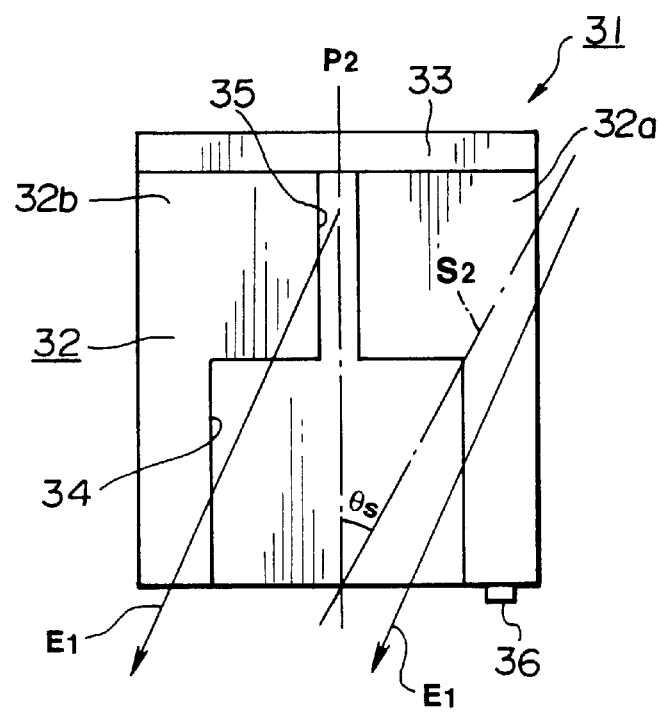
FIG. 9 is a bottom view showing the state of air flow with respect to the head slider when skew angle takes place.

Further, the air lubricating surface 32 is formed so as to have large area on the air inflow end side as described above, thus making it possible to produce large positive pressure between the air lubricating surface 32 and the surface of the magnetic head 12. For this reason, even in the case where the position extending over the inner and outer circumferences with respect to the magnetic disc 12 of the head slider 31 is changed, the skew angle θs which is an angle that the center line $P_2$ extending from the air inflow side to the air outflow side of the head slider 31 and the tangential line (tangent) $S_2$ of the recording track of the magnetic disc 12 form changes, as shown in FIG. 9, whereby direction of air flow $E_1$ which flows into the head slider 31 is inclined in correspondence with the skew angle θs with respect to the center line $P_2$ of the head slider 31, sufficient large positive pressure can be produced. Accordingly, fluctuation (change) of the floating quantity from the magnetic disc 12 of the head slider 31 by Fluctuation (change) of the skew angle θs is reduced. Thus, even in the case where the head slider 31 is moved to any position extending over the inner and outer circumferences of the magnetic disc 12, constant floating quantity can be maintained.

Furthermore, at the surface side where the air lubricating surface 32 is formed of the head slider 31, the groove portion 35 which halves the air lubricating surface in the width direction to form the first and second rail portions 32a, 32b is provided. As the result of the fact that this groove portion 35 is provided, respectively independent positive pressures by air flow are produced at the first and second rail portions 32a, 32b formed on the both sides extending from the recessed portion 34 to the groove portion 35. As a result, floating forces are respectively independently produced by these positive pressures. Thus, at the portions of the first and second rail portions 32a, 32b respectively opposite to the inner circumferential side and the outer circumferential side of the magnetic disc 12, positive pressures corresponding to linear velocities of the inner circumferential side and the outer circumferential side of the magnetic disc 12 are produced.

In this case, when the skew angle θs with respect to the recording tracks of the head slider 31 changes, air flow $E_1$ with respect to the head slider 31 obliquely flows thereinto as shown in FIG. 9. As a result, the floating force with the inflow direction of the air flow $E_1$ being as the center is produced with respect to this head slider 31. Thus, the head slider 31 is caused to undergo force to rotate with the center line $P_2$ being as the center. In this case, magnitudes of positive pressures produced at the first and second rail portions 32a, 32b are different from each other. Namely, at this time, positive pressure produced at the first or the second rail portion 32a, 32b close to the surface of the magnetic disc 12 becomes large. As a result, large floating force is produced. At this time, positive pressure produced at the second or the first rail portion 32b, 32a apart (spaced) from the surface of the magnetic disc 12 becomes smaller than that of the side close to the magnetic disc 12, thus to produce small floating force. As a result, even in the case where such a force to rotate is applied to the head slider 31, positive pressures corresponding to floating forces of the first and second rail portions 32a, 32b are produced so that rotation of the head slider 31 is suppressed. Thus, the entire surface of the air lubricating surface 32 can be equally floated from the surface of the magnetic disc 12. Accordingly, even in the case where the magnetic head 36 is attached at the position caused to undergo displacement to the first rail portion 32a side, it is possible to hold fluctuation (change) of the floating quantity from the magnetic disc 12 of the magnetic head 36 down to small value. Thus, information signals can be precisely recorded and/or reproduced with respect to desired recording tracks.

The above-described head slider 31 is adapted so that the recessed portion 34 is formed extending from the air outflow end toward substantially the central portion in the length direction. In this case, the length in the length direction of the recessed portion 34 is suitably adjusted in dependency upon balance between positive pressure by the air lubricating surface 32 and negative pressure by the recessed portion 34. In addition, in a manner similar to the above, the width of the groove portion 35 is also suitably selected in dependency upon balance between positive pressure and negative pressure.

Figure 10:
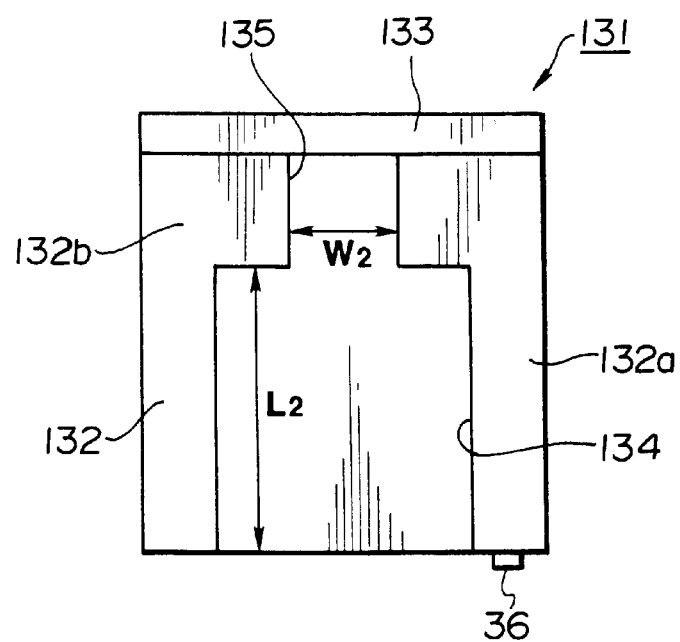
FIG. 10 is a bottom view showing another embodiment of the head slider according to this invention.

A head slider 131 shown in FIG. 10 is adapted so that a recessed portion 134 is formed in the state further extended to the air inflow end side from substantially the central portion, and its length $L_2$ is caused to be greater than the length $L_1$ of the recessed portion 34 formed in the previously described head slider 31 shown in FIGS. 7 and 8. In addition, the width $W_2$ of a groove portion 135 is caused to be greater than the width $W_1$ of the groove portion 35 of the head slider 31 shown in FIGS. 7 and 8.

The head slider 131 shown in FIG. 10 is such that the recessed portion 134 is formed to be large. Thus, the area of an air lubricating surface 132 becomes small. Accordingly, positive pressure produced by air flow which flows into the portion between first and second rail portions 132a, 132b and the surface of the magnetic disc 12 becomes small, and negative pressure produced by the recessed portion 134 also becomes small. Accordingly, the floating force also becomes small, and the floating quantity from the surface of the magnetic disc 12 of the head slider 31 and the magnetic head 36 also becomes small.

Figure 11:
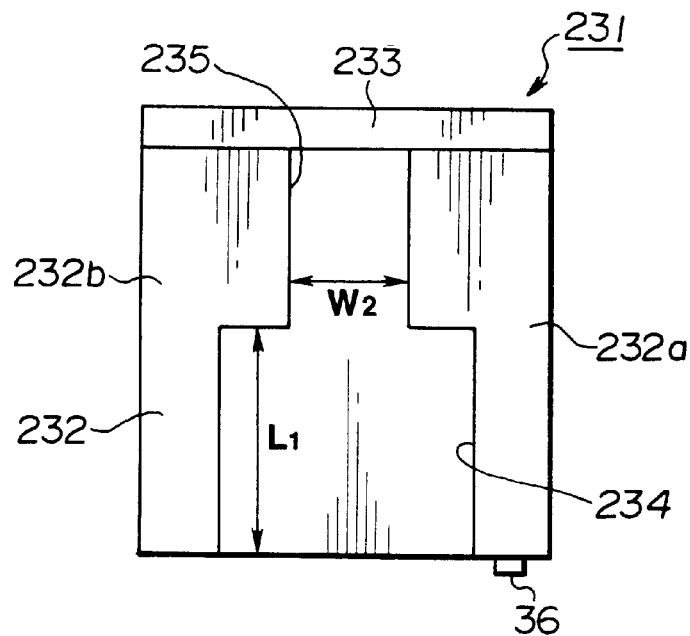
FIG. 11 is a bottom view showing a further embodiment of the head slider according to this invention.

Moreover, a head slider 231 shown in FIG. 11 is formed so that the length of a recessed portion 234 is caused to be the same as the length $L_1$ of the recessed portion 34 formed at the head slider 31 shown in FIGS. 7 and 8, and the width $W_2$ of a groove portion 235 is caused to be the same as the width $W_2$ of the groove portion 35 of the head slider 131 shown in FIG. 10.

In the case of the head slider 231 formed as shown in FIG. 11, as the result of the fact that the groove 235 broad in width is provided, the areas of the first and second rail portions 232a, 232b constituting the air lubricating surface 232 become small. Accordingly, relatively small floating force is only produced. Thus, the floating quantity from the surface of the magnetic disc 12 of the head slider 231 and the magnetic head 36 is set to a small value.

A further embodiment of the floating type head slider according to this invention will now be described.

A head slider 41 of this embodiment is also formed as a flat parallelepiped as s whole similarly to the previously described respective head sliders. Also in this head slider 41, at the lower surface side opposite to the surface where the signal recording area is formed of the magnetic disc 12 when attached to the rotational arm 14 of the disc drive, an air lubricating surface 42 formed as a flat surface is provided. This air lubricating surface 42 constitutes an air bearing which is air flow along with the surface of the rotating magnetic disc 12. Moreover, at the lower surface side of the head slider 41, at the corner portion positioned at the air inflow end side opposite to the rotational direction of the magnetic disc 12 when this head slider 41 is attached to the rotational arm 14, a taper portion 43 is formed. This taper portion 43 serves to allow air to smoothly flow into the portion between the air lubricating surface 42 and the surface of the magnetic disc 12 when the magnetic disc 12 starts rotation.

Further, at the lower surface side where the air lubricating surface 42 is formed of the head slider 41, a recessed portion 44 is provided in a manner to cut the flat air lubricating surface 42. This recessed portion 44 is formed as a rectangle (parallelepiped) (more particularly, trapezoid as described below) extending from the air outflow end side of the opposite side opposite to the air inflow end where the taper portion 43 is formed toward the portion in the vicinity of the central portion of the head slider 41 in the state positioned at the central portion in the width direction of the head slider 41. The recessed portion 44 formed here is formed so as to take a trapezoidal shape to gradually become narrower from the air inflow end side toward the air outflow end side. It is to be noted that the recessed portion 44 is formed bilaterally symmetrical with the center in the length direction of the head slider 41 being as the center.

Moreover, a groove portion 45 having a width narrower than that of the recessed portion 44 is formed extending from the end edge positioned at the air inflow end side of the internal side of the recessed portion 44 toward the position where the taper portion 43 is formed of the air inflow end side in the state positioned at the central portion in the width direction of the head slider 41. This groove portion 45 is formed so as to have the same depth as that of the recessed portion 44, and is formed by etching processing, etc. together with the recessed portion 44.

Figure 12:
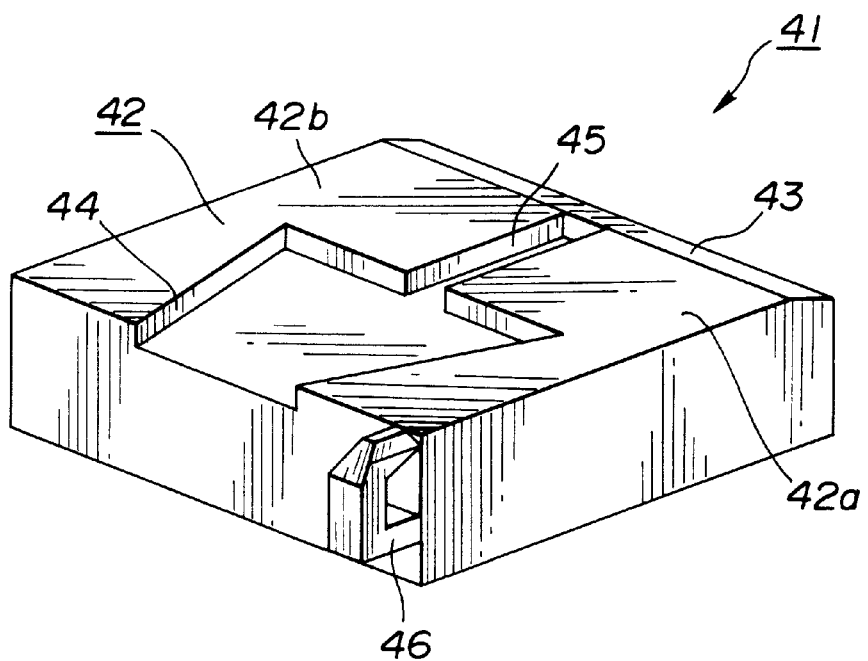
FIG. 12 is a perspective view of the bottom side showing a still further embodiment of the head slider according to this invention.
Figure 13:
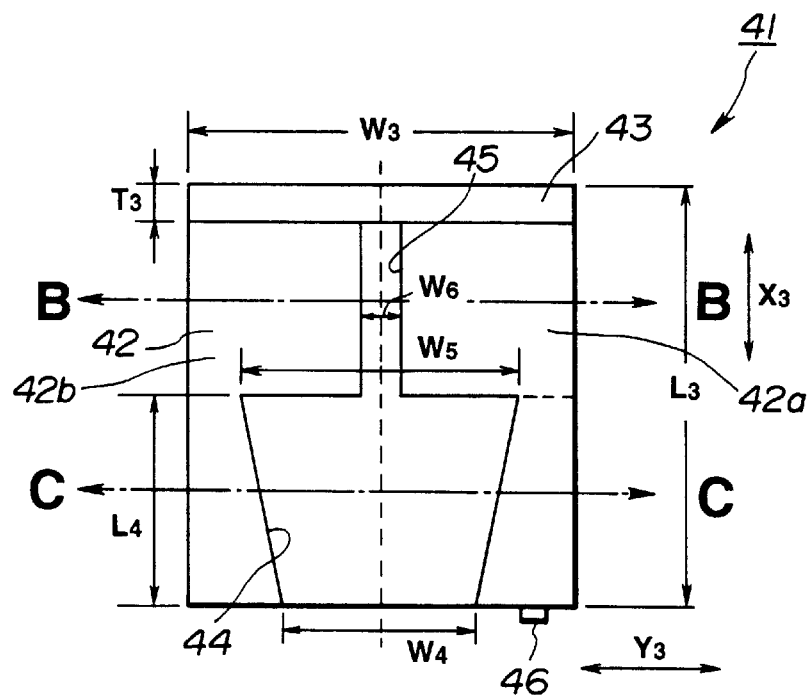
FIG. 13 is a bottom view of the head slider.

Here, since the recessed portion 44 is formed extending from the air outflow end side toward the portion in the vicinity of the central portion of the head slider 41, it is formed in the state where the air outflow end side is opened and the air inflow end side is closed as shown in FIGS. 12 and 13. Moreover, the groove portion 45 is similarly formed in the state where the air outflow end side is opened and the air inflow end side is closed by the taper portion 43 as shown in FIGS. 12 and 13.

Further, since the recessed portion 44 and the groove portion 45 are formed extending from the air outflow end side toward the air inflow end side in the state positioned at the central portion in the width direction of the head slider 41, the air lubricating surface 42 is divided into two areas in left and right directions so that one side is caused to serve as a first rail portion 42a and the other side is caused to serve as a second rail portion 42b.

Figure 14:
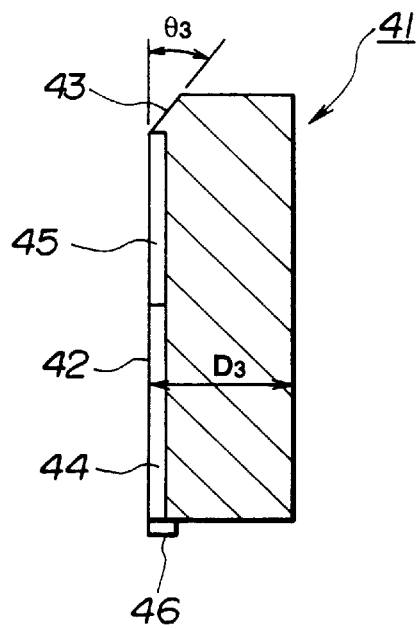
FIG. 14 is a longitudinal cross sectional view of the head slider.
Figure 15:
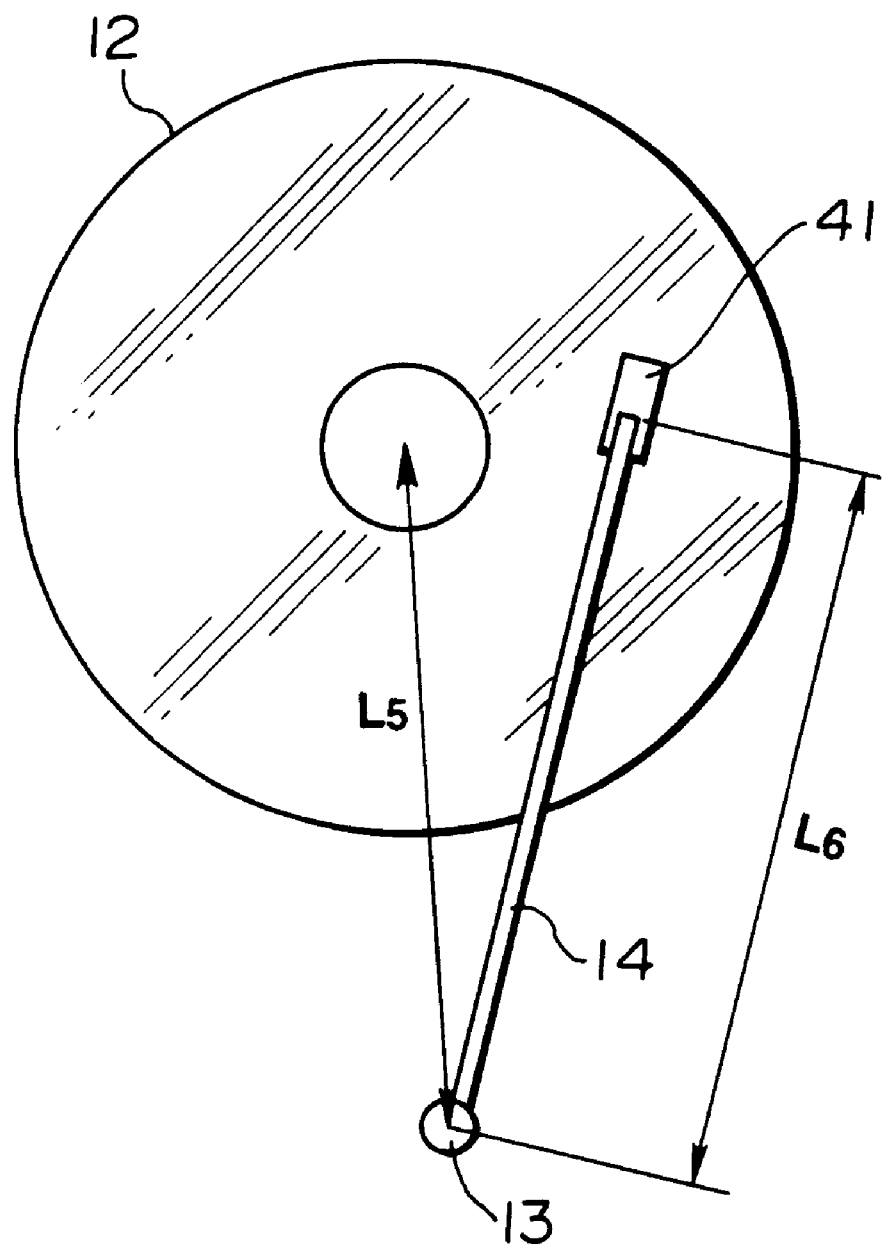
FIG. 15 is a plan view showing the state where the head slider according to this invention is mounted in a disc drive.

The head slider 41 of this embodiment is formed as shown in FIGS. 13 and 14 as a parallelepiped (rectangle) such that length $L_3$ is caused to be 1.2 mm, the width $W_3$ is caused to be 1.0 mm, and the thickness $D_3$ is caused to be 0.3 mm. Moreover, the taper portion 43 is formed so that the length $T_3$ is caused to be 0.12 mm extending over the entire width of the head slider 41. This taper portion 43 is formed so as to have inclination angle $\theta_3$ of about 0.85 degrees with respect to the air lubricating surface 42 as shown in FIG. 14 similarly to the head slider 31.

Further, the recessed portion 44 is formed so as to take a trapezoidal shape such that the length $L_4$ is caused to be 0.6 mm, the narrow width $W_4$ of the air outflow end side is caused to be 0.5 mm and the broad width $W_5$ of the air inflow side positioned at the inward side of the head slider 41 is caused to be 0.7 mm. In addition, the groove portion 45 continuous to the recessed portion 44 is formed so that its width $W_6$ is caused to be 0.1 mm and its length is equal to a value from the air inflow end side of the recessed portion 44 toward the taper portion 43.

A magnetic head 46 is attached to the end surface of the air outflow end side of the head slider 41 to constitute a magnetic head device. This magnetic head 46 is attached at the position biased to the side of one side surface where the first rail portion 42a is formed as shown in FIGS. 12 and 13. Namely, the magnetic head 46 is attached so that when the head slider 41 is attached to the rotational arm 14 of the disc drive, it is positioned at the outer circumferential side of the magnetic disc 12.

The results obtained by simulating, by computer, the pressure fluctuation (change) and the floating quantity fluctuation (change) when the head slider 41 constituted as described above is mounted in the disc drive in which the interaxis distance (distance between axes) $L_5$ from the support shaft 13 which is the center of rotation of the rotational arm 14 to the center of rotation of the magnetic disc 12 rotationally operated by the spindle motor is caused to be 30.0 mm, the arm length $L_6$ of the rotational arm 14, i.e., the distance from the support shaft 13 which is the center of rotation of the rotational arm 14 to the center of the head slider 41 attached at the front end side of the rotational arm 14 is caused to be 28.0 mm, and the seek radius which is the scanning range extending in the radial direction of the magnetic disc 12 of the magnetic head 46 attached to the head slider 41 is caused to be 10.0 mm to 22.0 mm are indicated below. Namely, the disc drive of the above-described condition is prepared to calculate, by computer, the pressure fluctuation (change) and the floating quantity fluctuation (change) when the magnetic disc 12 is actually rotationally operated to move the head slider 41 to the inner and outer circumferential sides of the magnetic disc 12.

Figure 16:
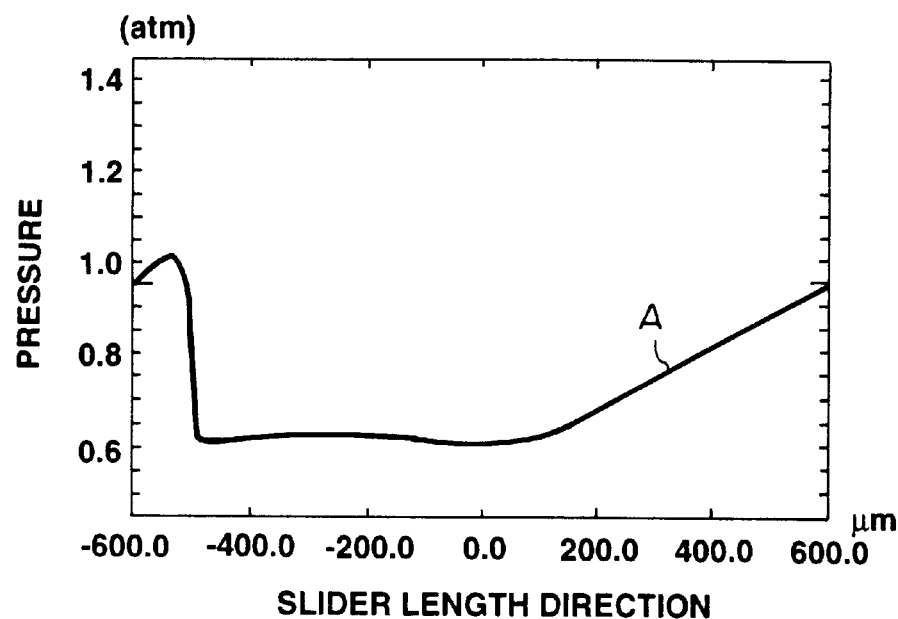
FIG. 16 is a characteristic diagram showing fluctuation (change) in pressure in a length direction when the head slider shown in FIG. 13 is driven in the state mounted in the disc drive.

As a result, as the pressure fluctuation (change) in the direction indicated by arrow $X_3$ in FIG. 13 extending in the length direction from the air inflow end to the air outflow end of the head slider 41, pressure distribution curve as indicated by curve A in FIG. 16 was obtained.

Figure 17:
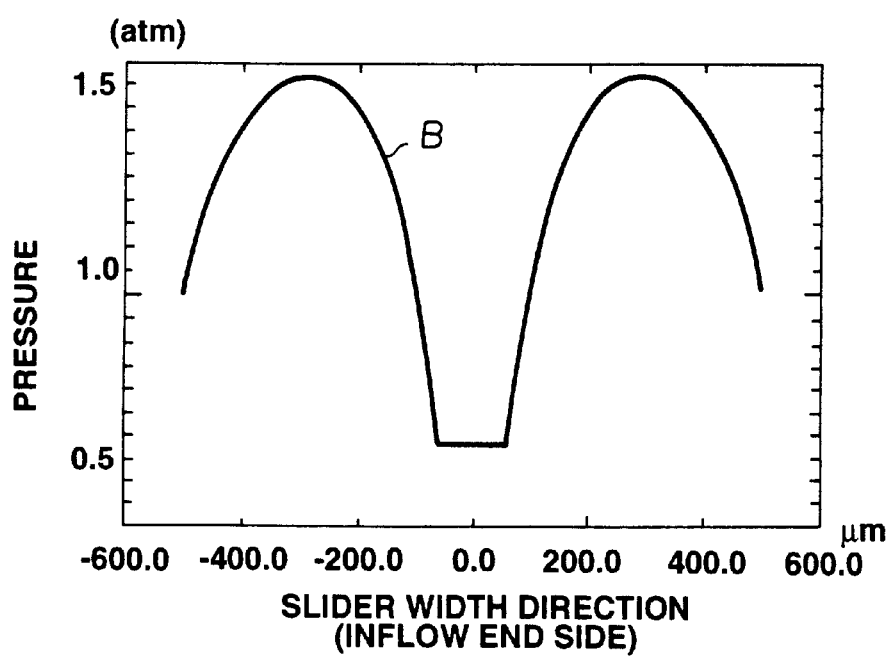
FIG. 17 is a characteristic diagram showing fluctuation (change) in pressure at the air inflow end side when the head slider shown in FIG. 13 is driven in the state mounted in the disc drive.

Moreover, in the pressure fluctuation (change) in the $Y_3$ direction in FIG. 13 which is the width direction of the head slider 41, as pressure fluctuation (change) at the position of 0.3 mm from the air inflow end of the head slider 41 on the lines B—B indicated by arrow in FIG. 13, i.e., the position to traverse the groove portion 45, pressure distribution curve as indicated by the curve B in FIG. 17 was obtained. Further, in the pressure fluctuation (change) in the direction indicated by arrow $Y_3$ in FIG. 13 which is the width direction of the head slider 41, pressure fluctuation (change) at the position of 0.3 mm from the air outflow end of the head slider on the lines C—C indicated by arrow in FIG. 13, i.e., the position to traverse the recessed portion 44, pressure distribution curve as indicated by curve C in FIG. 18 was obtained.

Figure 18:
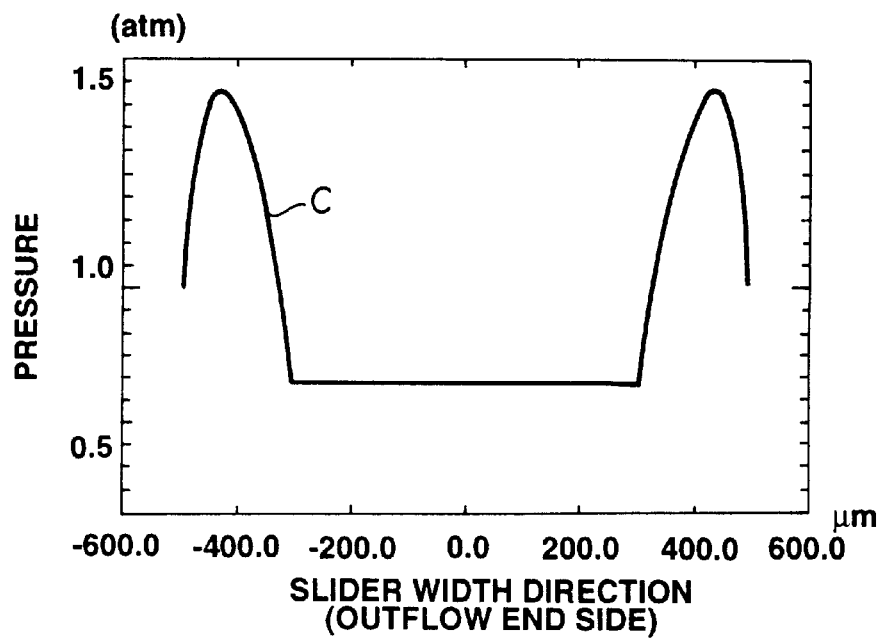
FIG. 18 is a characteristic diagram showing fluctuation (change) in pressure at the air outflow end side in the state similar to the above.

It is seen from these results of FIGS. 17 and 18 that negative pressure is produced by existence of the recessed portion 44, and positive pressure is divided in left and right directions by existence of the groove portion 45.

Figure 19:
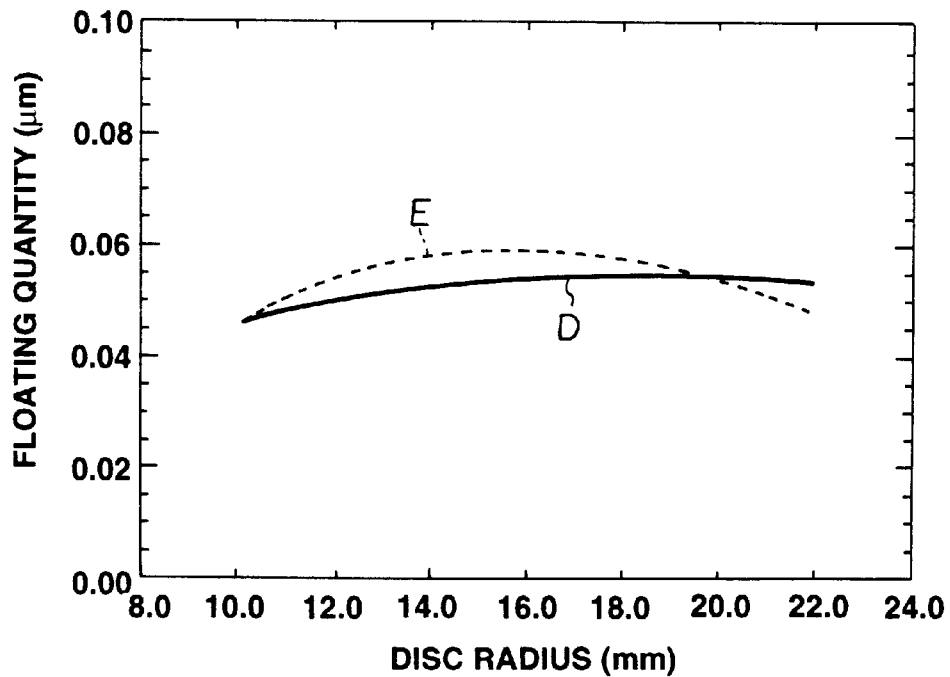
FIG. 19 is a characteristic diagram showing fluctuation (change) of the floating quantity when the head slider according to this invention is driven in the state mounted in the disc drive and that when the conventional head slider is driven in the state mounted in the disc drive.

Moreover, from the simulation using the above-described disc drive, profile indicated by curve D in FIG. 19 was obtained in connection with fluctuation (change) of the floating quantity from the surface of the magnetic disc 12 of the head slider 41. It is seen from the result shown in FIG. 19 that fluctuation (change) DFH of the floating quantity from the surface of the magnetic disc 12 of the head slider 41 was held down to the range of 0.0068302 μm.

Figure 20:
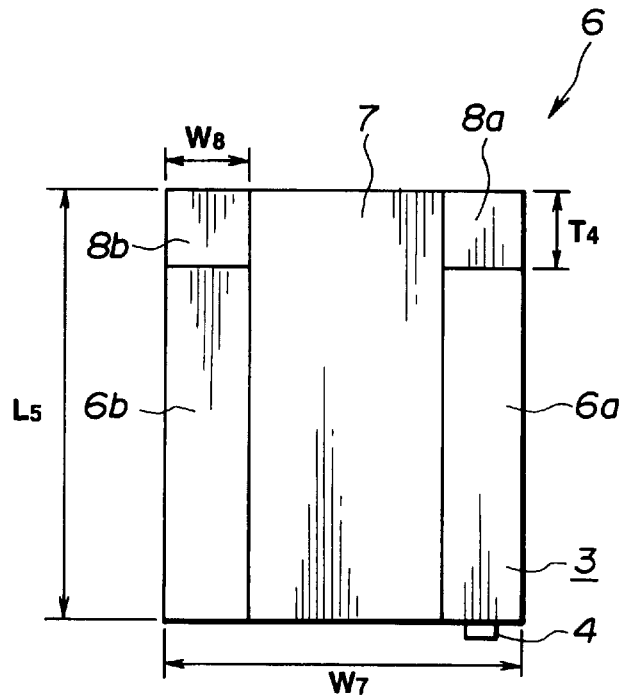
FIG. 20 is a bottom view of the conventional head slider.
Figure 21:
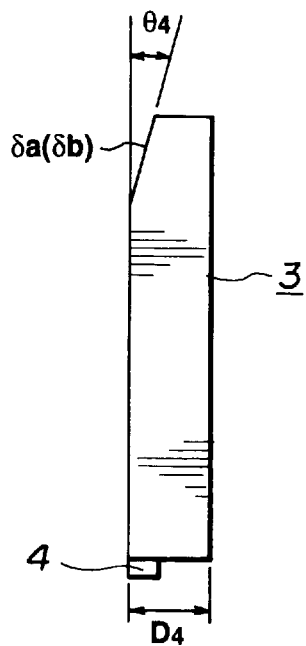
FIG. 21 is a side view of the head slider.

It is to be noted that the curve E shown in FIG. 19 indicates the profile of fluctuation (change) of the floating quantity in the case where the previously described conventional head slider 3 is used for comparison with the head slider 41 according to this invention. This conventional head slider 3 is formed as a parallelepiped such that the length $L_5$ is caused to be 1.2 mm, the width $W_7$ is caused to be 1.0 mm, and the thickness $D_4$ is caused to be 0.3 mm as shown in FIGS. 20 and 21. The conventional head slider 3 is formed so that the lengths $T_4$ of the taper portions 8*a*, 8*b* are caused to be 0.12 mm. The conventional head slider 3 is formed so that the inclination angles $\theta_4$ of the taper portions 8*a*, 8*b* are caused to be 0.85 degrees. In addition, widths $W_8$ of respective side rails 6*a*, 6*b* are caused to be 0.166 mm, and weight when the head slider is in contact with the magnetic disc 1 is caused to be 1.5 g. In this case, fluctuation (change) DFH of the floating quantity from the surface of the magnetic disc 1 of the head slider 3 is 0.120754 μm.

It is seen from the profile of fluctuation (change) of the floating quantity shown in FIG. 19 that fluctuation (change) of the floating quantity is suppressed to much degree in the head slider 41 according to this invention as compared to the conventional head slider 3.

As is clear from the results of the simulation as described above, in accordance with the head slider 41 according to this invention, the head slider 41 and the magnetic head 46 attached at the air outflow end side of the head slider 41 are floated with a fixed spacing (distance) from the surface of the magnetic disc 12 by positive pressure produced between the air lubricating surface 42 and the surface of the magnetic disc 12 and negative pressure produced at the portion of the recessed portion 44 to scan the surface of the magnetic disc 12 extending over the inner and outer circumferences. At this time, the floating quantity from the surface of the magnetic disc 12 of the head slider 41 is maintained substantially constant even in the case where position is shifted in the radial direction of the magnetic disc 12.

Figure 22:
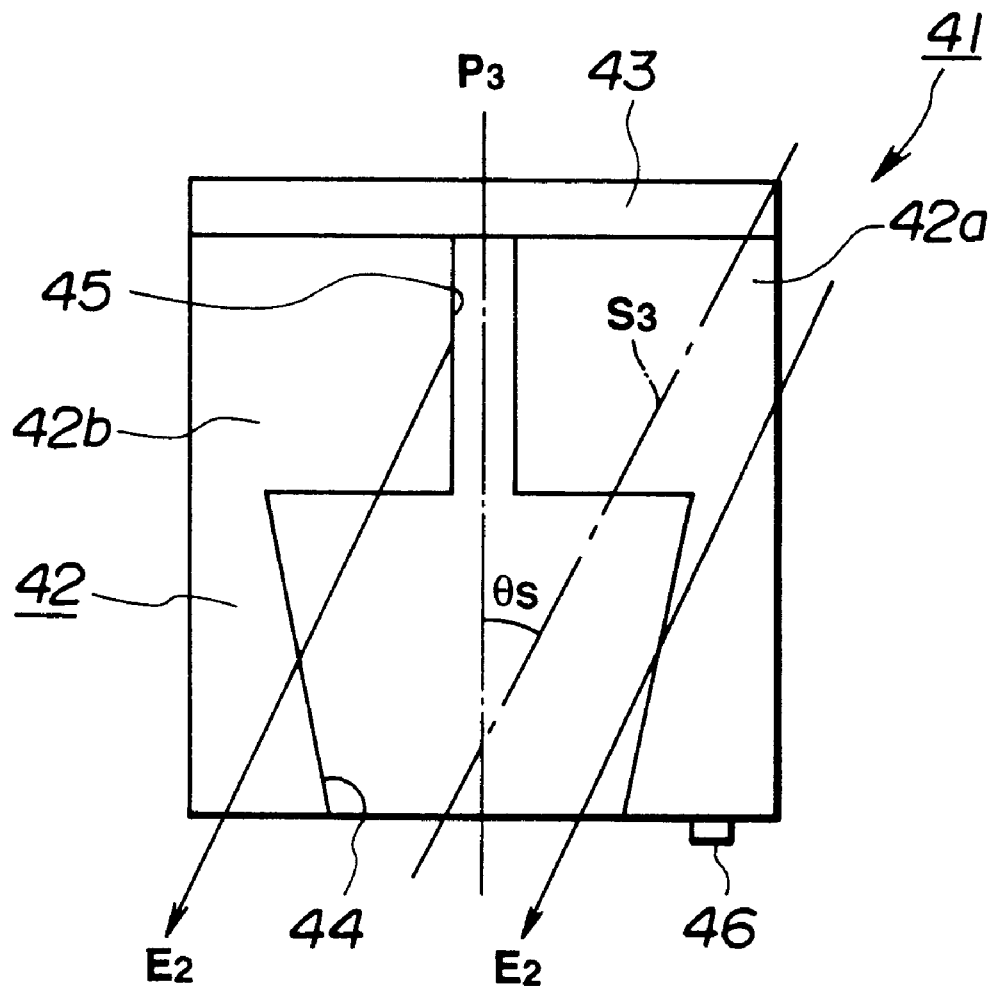
FIG. 22 is a bottom view showing the state of air flow when skew angle takes place in the head slider shown in FIG. 12.

Further, since the head slider 41 is adapted so that the air lubricating surface 42 is greatly widened in the length direction extending from the air inflow end side to the air outflow end side, position extending over inner and outer circumferences with respect to the magnetic disc 12 of the head slider 41 is varied. As a result, as shown in FIG. 22, the skew angle θs which is the angle that the center line $P_3$ extending from the air inflow side to the air outflow side of the head slider 41 and the tangential line (tangent) $S_3$ of recording tracks of the magnetic disc 12 form is varied. Thus, even in the case where the direction of the air flow $E_2$ which flows into the head slider 41 is inclined in correspondence with the skew angle θs with respect to the center line $P_3$ of the head slider 41, it is possible to generate sufficiently large positive pressure. Accordingly, fluctuation (change) of the floating quantity from the magnetic disc 12 of the head slider 41 by fluctuation (change) of the skew angle θs is reduced. Thus, even in the case where the head slider 41 is moved to any position extending over the inner and outer circumferences of the magnetic disc 12, constant floating quantity can be maintained.

Further, at the surface side where the air lubricating surface 42 is formed of the head slider 41, a groove portion 45 which halves the air lubricating surface in the width direction to form first and second rail portions 42*a*, 42*b* is provided similarly to the previously described head slider. Because the groove portion 45 is provided, positive pressures respectively independent by air flow $E_2$ are produced at the first and second rail portions 42*a*, 42*b* formed on the both sides extending from the recessed portion 44 to the groove portion 45, and floating forces are also respectively independently produced by these positive pressures. In addition, at the portions of the first and second rail portions 42*a*, 42*b* respectively opposite to the inner circumferential side and the outer circumferential side of the magnetic disc 12, positive pressures corresponding to linear velocities of the inner circumferential side and the outer circumferential side of the magnetic disc 12 are produced.

In this case, as the result of the fact that the skew angle θs with respect to recording tracks of the head slider 41 is changed, the air flow $E_2$ with respect to the head slider 41 flows thereinto in the state inclined as shown in FIG. 22. As a result, floating force with the inflow direction of the air flow $E_2$ being as the center is produced with respect to this head slider 41. Thus, the head slider 41 is caused to undergo such a force to rotate with the center line $P_3$ being as the center. In this case, similarly to the previously described embodiments, magnitudes of positive pressures produced at the first and second rail portions 42*a*, 42*b* are different from each other. At this time, positive pressure produced at the first or second rail portion 42*a* or 42*b* close to the surface of the magnetic disc 12 becomes great. As a result, large floating force is produced. On the other hand, positive pressure produced at the second or first rail portion 42*b* or 42*a* apart (spaced) from the surface of the magnetic disc 12 becomes smaller than that at the side close to the magnetic disc 12, thus to produce small floating force. As a result, even in the case where such a force to rotate is applied to the head slider 41, positive pressures corresponding to floating forces at the first and second rail portions 42*a*, 42*b* side are produced. Thus, rotation of the head slider 41 is suppressed, thereby making it possible to equally float the entire surface of the air lubricating surface 42 from the surface of the magnetic disc 12. Accordingly, even in the case where the magnetic head 46 is attached at the position caused to undergo displacement to the first rail portion 42*a* side, fluctuation (change) of the floating quantity from the magnetic disc 12 of the magnetic head 46 can be held down to a small value. Thus, information signals can be precisely recorded and/or reproduced with respect to desired recording tracks.

Meanwhile, since the recessed portion 44 of the head slider 41 of this embodiment is formed so as to take a trapezoidal shape to gradually become narrower from the air inflow end side toward the air outflow end side, the first and second rail portions 42*a*, 42*b* formed on the both sides of the recessed portion 44 respectively gradually become broader toward the air inflow end. As the result of the fact that the first and second rail portions 42*a*, 42*b* are formed in this way, even in the case where the skew angle θs is changed, the boundary line between the recessed portion 44 and the taper portion of the first or second rail portion 42*a*, 42*b* is substantially matched in the direction of the air flow $E_2$ corresponding to the skew angle θs. Accordingly, in the case where the skew angle θs takes place, sufficient large floating force is produced by the first or second rail portion 42*a* or 42*b*. For this reason, fluctuation (change) of the floating quantity from the surface of the magnetic disc 12 of the head slider 41 by fluctuation (change) of the skew angle θs can be more securely suppressed. Thus, more precise recording and/or reproduction of information signals with respect to the magnetic disc 12 by the magnetic head 46 can be carried out.

Figure 23:
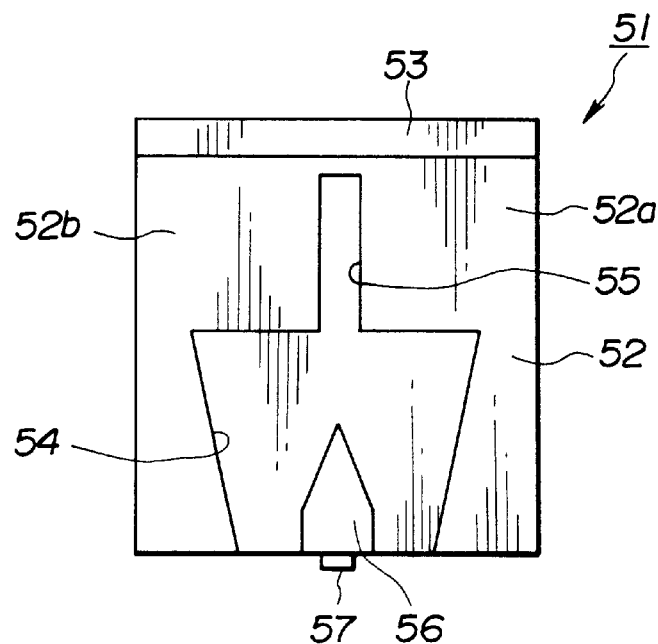
FIG. 23 is a bottom view showing a still more further embodiment of the head slider according to this invention.

FIG. 23 shows a still more further different embodiment of the floating type head slider according to this invention.

This head slider 51 is also formed as a flat parallelepiped as a whole similarly to the previously described head slider shown in FIG. 12. Also in this head slider 51, at the lower surface side opposite to the surface where the signal recording area is formed of the magnetic disc 12 when attached to the rotational arm 14 of the disc drive, an air lubricating surface 52 formed as a flat surface is formed. At the corner portion positioned at the air inflow end side opposite to the rotational direction of the magnetic disc 12, a taper portion 53 is formed. Moreover, at the lower surface side where the air lubricating surface 52 is formed, there is provided a recessed portion 54 formed so as to take a trapezoidal shape to gradually become narrower from the air inflow end side toward the air outflow end side in such a manner to cut the flat air lubricating surface 52. Further, there is formed a groove portion 55 having a width narrower than that of the recessed portion 54 from the end edge positioned at the air inflow end side of the internal side of the recessed portion 54 toward the taper portion 53 side of the air inflow end side in the state positioned at the central portion in the width direction of the head slider 51. This groove portion 55 is such that the air inflow end side is closed by the air lubricating surface 52.

Meanwhile, in the head slider 51 of this embodiment, there is bored a guide flow portion 56 positioned at the central portion of the air outflow end side within the recessed portion 54 and common in height to the air lubricating surface 52. A magnetic head 57 is attached to the end surface of the air outflow end side of the guide flow portion 56.

The guide flow portion 56 is formed in such a manner that the air outflow end side is caused to be broad and it takes a tapered shape toward the air inflow end side. As the result of the fact that the guide flow portion 56 formed in this way is provided, air flow flowing within the recessed portion 54 flows to the air outflow end side in the state branched in left and right directions by the guide flow portion 56.

Since the magnetic head unit constructed with such head slider 51 is adapted so that the magnetic head 57 is attached to the central portion of the air outflow end of the head slider 51, also in the case where roll phenomenon in which the head slider 51 rotates about the center axis in the length direction is caused to take place, the magnetic head 57 can maintain a fixed spacing in the state where there is no possibility that position from the surface of the magnetic disc 12 is varied. Moreover, air flow flowing within the recessed portion 54 toward the magnetic head 57 can smoothly flow in the state branched in left and right directions by the guide flow portion 56 tapered at the front end (tip) thereof. Even in the case where the magnetic head 57 is attached in the state faced to the central portion of the recessed portion 54, there is no possibility that stay of air flow or lowering in flow rate may take place, and there is also no possibility that dust, etc. included in the air flow may stay on the end surface of the air inflow end side of the guide flow portion 56. Thus, the air flow can be smoothly passed through the air outflow end.

While the guide flow portion 56 tapered at the tip thereof is provided within the recessed portion 54 which takes trapezoidal shape in the embodiment shown in FIG. 23, the shape of the recessed portion 54 may be suitably adjusted, in addition to the above-mentioned example, in dependency upon balance between positive pressure by the air lubricating surface 52 and negative pressure by the recessed portion 54, and in order that the influence of air flow by the guide flow portion 56 is not reduced.

Figure 24:
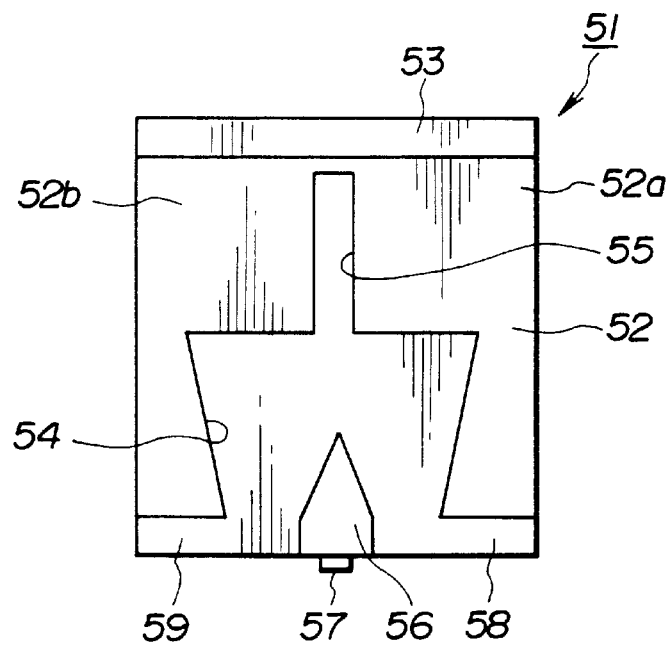
FIG. 24 is a bottom view showing a further different embodiment of the head slider according to this invention.

Moreover, while the recessed portion 54 is formed so that the air outflow end side is narrow in the embodiment shown in FIG. 23, a pair of first and second auxiliary recessed portions 58, 59 extending to the side edges of the head slider 51 may be provided on the both sides of the guide flow portion 56 at the air outflow end side as shown in FIG. 24. By providing the first and second auxiliary recessed portions 58, 59 in this way, air flow flowing within the recessed portion 54 and branched in left and right directions by the guide flow portion 57 is wandered in left and right directions by the first and second auxiliary recessed portions 58, 59. Thus, air flow within the recessed portion 54 is compressed by the guide flow portion 57 so that decrease in the negative pressure can be avoided.

Figure 25:
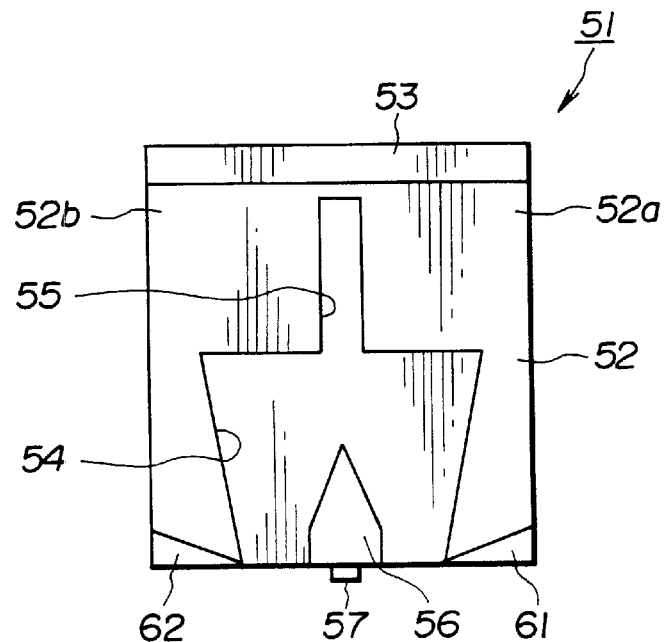
FIG. 25 is a bottom view showing a still further different embodiment of the head slider according to this invention.

Further, first and second auxiliary recessed portions 61, 62 may be provided so as to cut the corner portions of the both sides of the air outflow end side of the head slider 51 as shown in FIG. 25. By providing the first and second auxiliary recessed portions 61, 62 in this way, positive pressure by air flow flowing between the air lubricating surface 52 and the surface of the magnetic disc 12 becomes small. However, negative pressure by the recessed portion 54 is not changed. Accordingly, relatively small floating force is obtained as a whole. Thus, the floating quantity from the surface of the magnetic disc 12 of the head slider 51 can be reduced. Further, in the case where the head slider 51 is moved to the inner and outer circumferential sides of the magnetic disc 12 so that the skew angle θs takes place, since the air lubricating surface 52 has relatively large area with respect to air flow by the skew angle θs, such a phenomenon that the floating force is reduced does not take place.

Figure 26:
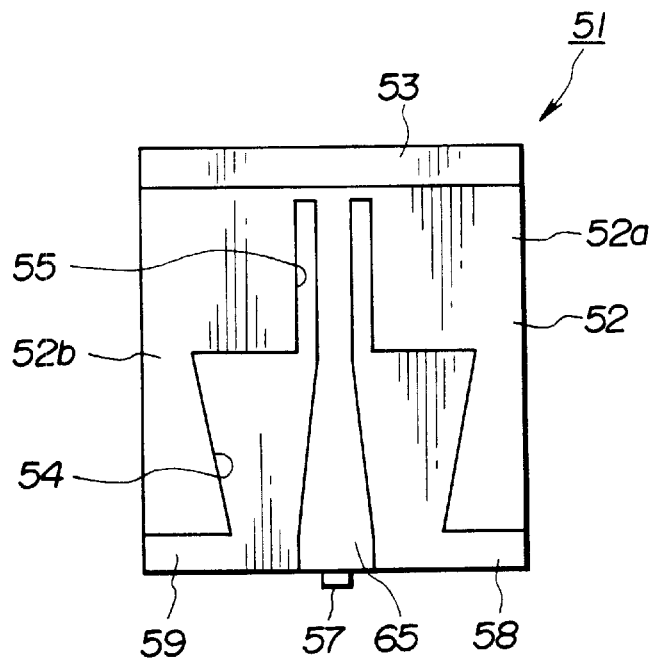
FIG. 26 is a bottom view showing a still more further different embodiment of the head slider according to this invention.

Furthermore, the guide flow portion 65 provided within the recessed portion 54 may be formed as shown in FIG. 26 so that the guide flow portion 65 is extended into groove portion 55 continuous to recessed portion 54 so that the groove portion 55 is divided in left and right directions.

In this case, since the guide flow portion 65 is formed in a manner continuous to the air lubricating surface 52 without having end surface at the air inflow end side, air flow flowing within the recessed portion 54 flows in a state branched in left and right directions from the air inflow end side by the guide flow portion 65. Accordingly, the air flow is widened (spread) in left and right directions by first and second auxiliary recessed portions 58, 59 formed at the air outflow end side of the recessed portion 54 smoothly along the side surface of the guide flow portion 65. Thus, air flow within the recessed portion 54 is compressed by the guide flow portion 65. As a result, a decrease in the negative pressure can be avoided.

It is to be noted that while more practical shapes are respectively disclosed in connection with the air lubricating surface, the recessed portion, the groove portion and the guide flow portion in the above-described embodiments, they may be disposed so as to have a recessed portion to produce negative pressure with respect to the air lubricating surface to produce positive pressure, and the lengths, the widths, the configurations, and the inclination angles of respective components may be suitably selected in correspondence with the disc drive actually mounted. Accordingly, the air lubricating surface, the recessed portion, the groove portion and the guide flow portion of the head slider according to this invention are not limited to shapes and/or arrangements, etc. disclosed in the above-described embodiments, but combination thereof may be employed.

In addition, the head slider according to this invention can be widely applied to disc drive adapted for scanning the signal recording area of the disc-shaped recording medium without allowing the magnetic head attached to the head slider to be in contact with the disc recording medium. Accordingly, the head slider according to this invention can be applied to disc drive using not only the magnetic disc but also magneto-optical disc, etc. as a recording medium.

The head slider according to this invention is floated with a constant floating quantity from the surface of the disc-shaped recording medium in a stable state by positive pressure produced between the air lubricating surface and the surface of the rotationally operated disc-shaped recording medium and negative pressure produced by the recessed portion. Moreover, in the case where relative movement velocity between the head slider and the disc-shaped recording medium opposite to which the head slider is opposed fluctuates (changes), since positive pressure and negative pressure are both changed in the same direction, fluctuation (change) of positive pressure is canceled by fluctuation (change) of negative pressure. As a result, fluctuation (change) of the floating quantity from the surface of the disc-shaped recording medium of the head slider can be reduced. Accordingly, the distances with respect to the disc-shaped recording medium of the head slider and the head attached to the head slider can be maintained constant at all times. Thus, precise recording and/or reproduction of information signals can be carried out.

Although modifications and changes may be suggested by those skilled in the art, it is the intention of the inventors to embody within the patent warranted hereon all changes and modifications as reasonably and properly come within the scope of their contribution to the art.

We claim:

1. An air bearing slider for supporting a transducer in relative motion with respect to a recording medium, comprising:
   an air bearing surface which faces the recording medium, the air bearing surface having a leading edge and a trailing edge;
   a first recess of a fixed depth formed in the air bearing surface and configured to generate negative air pressure therein during said relative motion, a trailing edge of the first recess being open in the trailing edge direction of the first recess and being closed in the leading edge direction, except for a second recess described next;
   a second recess in the air bearing surface which generates negative air pressure and which generally extends from the leading edge of the first recess to the leading edge of the air bearing surface along a center line of the first recess, the second recess being in fluid communication with the first recess, the second recess being closed in the direction of the leading edge of the air bearing surface, the first and second recess being open toward the recording medium, the second recess being narrower in width than said first recess as measured in a direction perpendicular to a center line of said air bearing surface extending between said leading and trailing edges, but parallel to said air bearing surface, the second recess being centrally positioned along the center line of the first recess.

2. The air bearing slider of claim 1, wherein the leading edge of the air bearing surface is tapered.

3. The air bearing slider of claim 1 wherein the first recess extends along the center line from the trailing edge of the air bearing surface to substantially a central portion of the air bearing surface.

4. The air bearing slider of claim 1, wherein the first recess has a taper such that it is narrower at the trailing edge of the air bearing surface than it is at the leading edge of the first recess.

5. The air bearing slider of claim 1, further comprising an auxiliary recess formed along a portion of the trailing edge of the air bearing surface and which extends in a direction perpendicular to the center line.

6. The air bearing slider of claim 1, further comprising auxiliary recesses formed along portions of the trailing edge of the air bearing surface and which extend in opposite directions from said trailing edge of said first recess.

7. The air bearing slider of claim 1, further comprising a protrusion positioned with said first recess at the trailing edge thereof so as to split air flowing out from said trailing edge into multiple streams.

8. A device having (1) a magnetic transducer, and (2) an air bearing slider for supporting said transducer in relative movement with respect to a recording medium, said slider comprising:
   an air bearing surface which faces the recording medium, the air bearing surface having a leading edge and a trailing edge;
   a first recess of a fixed depth formed in the air bearing surface and configured to generate negative air pressure therein during said relative movement, a trailing edge of the first recess being open in the trailing edge of the first recess being closed in the leading edge direction, except from a second recess described next;
   a second recess in the air bearing surface which also generates negative air pressure and which generally extends from the leading edge of the first recess to the leading edge of the air bearing surface along a center line of the first recess, the second recess being in fluid communication with the first recess, the second recess being in the direction of the closed leading edge of the air bearing surface, the first and second recess being open toward the recording medium, the second recess being narrower in width than said first recess when measured in a direction perpendicular to a center line of said air bearing surface extending between said leading and trailing edges, but parallel to said air bearing surface, the second recess being centrally positioned along the center line of the first recess.

9. The device of claim 8, wherein the leading edge of the air bearing surface is tapered.

10. The device of claim 8, wherein the first recess extends along the center line from the trailing edge of the air bearing surface to substantially a central portion of the air bearing surface.

11. The device of claim 8, wherein the first recess has a taper such that it is narrower at the trailing edge of the air bearing surface than it is at the leading edge of the first recess.

12. The device of claim 8, further comprising an auxiliary recess formed along a portion of the trailing edge of the air bearing surface and which extends in a direction perpendicular to the center line.

13. The device of claim 8, further comprising auxiliary recesses formed along portions of the trailing edge of the air bearing surface and which extend in opposite directions from said trailing edge of said first recess.

14. The device of claim 8, further comprising a protrusion positioned with said first recess at the trailing edge thereof so as to split air flowing out from said trailing edge into multiple streams.

15. A disk drive comprising:
   a disk-shaped recording medium rotated by rotation drive means;
   an air bearing slider on which a magnetic head is attached; and movement operation means for moving the slider relative to the disk-shaped recording means, the slider comprising:
- an air bearing surface which faces the recording medium, the air bearing surface having a leading edge and a trailing edge;
- a first recess of a fixed depth formed in the air bearing surface and configured to generate negative air pressure therein during said relative movement, a trailing edge of the first recess being open in the trailing edge of the first recess being closed in the leading edge direction, except from a second recess described next;
- a second recess in the air bearing surface which generates negative air pressure and which generally extends from the leading edge of the first recess to the leading edge of the air bearing surface along a center line of the first recess, the second recess being in fluid communication with the first recess, the second recess being in the direction of the closed leading edge of the air bearing surface, the first and second recess being open toward the recording medium, the second recess being narrower in width than said first recess when measured in a direction perpendicular to a center line of said air bearing surface extending between said leading and trailing edges, but parallel to said air bearing surface, the second recess being centrally positioned along the center line of the first recess.

16. The disk drive of claim 15, wherein the leading edge of the air bearing surface is tapered.

17. The disk drive of claim 15, wherein the first recess extends along the center line from the trailing edge of the air bearing surface to substantially a central portion of the air bearing surface.

18. The disk drive of claim 15, wherein the first recess has a taper such that it is narrower at the trailing edge of the air bearing surface than it is at the leading edge of the first recess.

19. The disk drive of claim 15, further comprising an auxiliary recess formed along a portion of the trailing edge of the air bearing surface and which extends in a direction perpendicular to the center line.

* * * * *